(12) United States Patent
Chou et al.

(10) Patent No.: US 7,340,567 B1
(45) Date of Patent: Mar. 4, 2008

(54) VALUE PREDICTION FOR MISSING READ OPERATIONS INSTANCES

(75) Inventors: Yuan C. Chou, Mountain View, CA (US); Santosh G. Abraham, Pleasanton, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 450 days.

(21) Appl. No.: 10/824,307

(22) Filed: Apr. 14, 2004

(51) Int. Cl.
*G06F 12/00* (2006.01)

(52) U.S. Cl. ...................................... 711/137
(58) Field of Classification Search ................ 711/137, 711/117, 118
See application file for complete search history.

(56) References Cited

U.S. PATENT DOCUMENTS

| 6,487,639 B1 * | 11/2002 | Lipasti ........................ 711/137 |
| 6,609,168 B1 * | 8/2003 | Willke, II .................... 710/110 |
| 6,883,086 B2 * | 4/2005 | Dundas ....................... 712/205 |

OTHER PUBLICATIONS

Armstrong, David N. et al., "Wrong Path Events: Exploiting Illegal and Unusual Program Behavior for Early Misprediction Recovery," *Proceedings of the 37th ACM/IEEE International Symposium on Microarchitecture*, Portland, Oregon, Dec. 2004, pp. 1-23.
Calder, Brad et al., "Selective Value Prediction," *Proceedings of the 26th International Symposium on Computer Architecture*, Atlanta, GA, USA, May 1-4, 1999, pp. 64-74.
Dreslinski, Ron and Karl, Eric, "RunaPred: A Hybrid Runahead/Value Prediction Approach," Electrical Engineering and Computer Science Department, University of Michigan, Ann Arbor, MI, Apr. 18, 2003, 8 pages, downloaded from the Internet at URL: http://www-personal.engin.umich.edu/~ekarl/Documents/EECS573RunaPred.pdf on Dec. 27, 2005.
Lipasti, Mikko H. et al., "Value Locality and Load Value Prediction," *ACM SIGPLAN Notices*, vol. 31, Issue 9, Sep. 1996, pp. 138-147.
Lipasti, Mikko H., "Value Locality and Speculative Execution," Dissertation for PhD, Electrical and Computer Engineering, Carnegie Mellon University, Pittsburgh, PA, Apr. 1997, pp. 1-194.
Mutlu, Onur et al., "On Reusing the Results of Pre-Executed Instructions in a Runahead Execution Processor," *Computer Architecture Letters*, vol. 4, Jan. 2005, 4 pages.

* cited by examiner

*Primary Examiner*—Hiep T. Nguyen
(74) *Attorney, Agent, or Firm*—Dorsey & Whitney LLP

(57) ABSTRACT

Typically, missing read operations instances account for a small fraction of the operations instances of an application, but for nearly all of the performance degradation due to access latency. Hence, a small predictor structure maintains sufficient information for performing value prediction for the small fraction of operations (the missing instances of read operations) that account for nearly all of the access latency performance degradation. With such a small predictor structure, a processor value predicts for selective instances of read operations, those selective instances being read operations that are unavailable in a first memory (e.g., those instances of read operations that miss in L2 cache). Respective actual values for prior missing instances of the read operations are stored and used for value predictions of respective subsequent instances of the read operations. The value predictions are, at least partially, based on accuracy of value predictions for prior corresponding missing instances of the read operations.

97 Claims, 10 Drawing Sheets

| Index | Predicted Value | Value Prediction Qualifier |
|---|---|---|
| <PC> | 43 | 3 |
| ... | ... | ... |
| ... | ... | ... |

Missing Read Operation Value
Prediction Encoding
201

FIG. 2A

| Index | Tag | Predicted Value | Value Prediction Qualifier |
|---|---|---|---|
| <PC High Order Bits> | <PC> | 43 | 3 |
| ... | ... | ... | ... |
| ... | ... | ... | ... |

Missing Read Operation Value Prediction Encoding
203

FIG. 2B

| Index | Tag | Predicted Value | Value Prediction Qualifier |
|---|---|---|---|
| <Hash of PC High Order Bits > | <Hash of PC and History> | 43 | 3 |
| ... | ... | ... | ... |
| ... | ... | ... | ... |

Missing Read Operation Value Prediction Encoding
205

FIG. 2C

VALUE PREDICTION FOR MISSING READ OPERATIONS INSTANCES

BACKGROUND

1. Field of the Invention

The present invention relates to the field of computers. More specifically, the present invention relates to computer architecture.

2. Description of the Related Art

The performance of general-purpose processors is increasingly burdened by the latency to access high-latency memory, such as main memory and off-chip cache. Access latency is incurred whenever a load or store instruction misses all of the processor's low-latency caches. This latency is continually increasing because the speed of processors is increasing faster than the speed of main memory and faster than the speed of off chip-caches. Due to the large latency to access main memory or off-chip caches, a load instruction that requires an access to such high-latency memory will likely cause the processor to stall until the load data returns. This stalling of the processor causes severe performance degradation. The processor stalls because it cannot find and execute enough instructions that are independent of the stalling load instruction to effectively conceal the access latency to the off-chip cache or main memory.

Generally, two approaches have been applied to the problem of processor performance degradation arising from access of high-latency memory. The first approach utilizes prefetching, which requires address computation and address prediction. Data is prefetched from the high-latency memory into low-latency memory. In order to prefetch the data, a compiler or hardware predicts the addresses of the value to be prefetched. However, address prediction can be difficult, and address computation consumes valuable resources.

The second approach utilizes multithreading. If a thread stalls while waiting for data to arrive from high-latency memory, then the processor switches to a different thread. Two-way and four-way multithreading can be utilized to effectively hide memory latency in applications with sufficient thread-level parallelism. However, four-way multithreading may be inadequate for some applications, and scalability of multithreading is limited by the processor. Going beyond four-way multithreading may require additional chip resources and/or increased design complexity.

In addition to the two generally applied approaches, a relatively new technique, value prediction, is being proffered to increase instruction-level parallelism by breaking true dependence chains. Value prediction techniques predict the resulting value for an instruction, and speculatively execute dependent instructions with the predicted value. Value prediction has been applied for all instruction types and for all load type instructions. In *Selective Value Prediction*, by Brad Calder et al., Proceedings of the 26th International Symposium on Computer Architecture (May 1999), a theoretical value prediction technique is investigated that filters both producer instructions (instructions that produce value predictions) and consumer instructions (dependent instructions that use predicted values as input operands). Based on the instruction filtering, values of particular instructions are installed in a value prediction table. The filtering is based on instruction type, as well as instruction priority. Priority is given to those instructions belonging to the longest data dependence path and the processor's active instruction window. Unfortunately, these value prediction techniques suffer when applied to real world applications.

The value prediction techniques utilize very large value prediction tables to be accommodated by a host processor, thus increasing processor complexity. In addition to these large value prediction tables, value prediction techniques, such as that proposed in *Selective Value Prediction*, require complex filtering and prioritization mechanisms that further complicate value prediction in an attempt to more efficiently utilize the large value prediction table. Accordingly, a technique that effectively conceals latency incurred from data requests is desirable.

SUMMARY OF THE INVENTION

It has been discovered that focusing value prediction on missing instances of read operations allows value prediction with a relatively small value predictor structure. Typically, missing read operation instances account for a small fraction of the operations of an application, but for nearly all of the performance degradation due to access latency. Hence, the performance is improved with value prediction while avoiding employment of a large value predictor structure that consumes valuable resources, such as processor real estate. In addition, focusing value prediction on missing instances of read operations avoids many of the complexities generally encountered with conventional value prediction techniques. An actual value for a read operation, which misses in low-latency memory (e.g., L2 cache) is stored. Once it is determined that the stored value can be reliably used as a predicted value for a subsequent instance of the read operation, the stored value is supplied for execution of the subsequent instance. A variety of state preservation techniques can be applied to mis-predictions.

These and other aspects of the described invention will be better described with reference to the Description of the Preferred Embodiment(s) and accompanying Figures.

BRIEF DESCRIPTION OF THE DRAWINGS

The present invention may be better understood, and its numerous objects, features, and advantages made apparent to those skilled in the art by referencing the accompanying drawings.

FIGS. 2A-2C depict exemplary missing read operations value prediction encodings. FIG. 2A depicts an exemplary missing read operations value prediction encoding indexed by program counter. FIG. 2B depicts an exemplary missing read operations value prediction encoding with indices and tags. FIG. 2C depicts an exemplary missing read operations value prediction encoding with hashed indices and tags.

FIG. 7A depicts exemplary invocation of a value prediction finite state machine. FIG. 7B depicts exemplary value prediction by a value prediction finite state machine. FIG. 7C depicts exemplary updating of the value prediction memory region.

FIG. 8A depicts exemplary missing read operation value prediction by a trap handler. FIG. 8B depicts exemplary updating of the value prediction memory region by the trap handler.

The use of the same reference symbols in different drawings indicates similar or identical items.

DESCRIPTION OF THE PREFERRED REALIZATION(S)

The description that follows includes exemplary systems, methods, techniques, and computer program products that embody techniques of the present invention. However, it is understood that the described invention may be practiced without these specific details. For instance, preserving execution state is described with exemplary techniques, such as buffering and register checkpointing. In other instances, well-known protocols, structures and techniques have not been shown in detail in order not to obscure the invention.

The description refers to read operations and missing read operation instances. The term read operation is used to describe a read action performed as a result of executing one or more instructions by a processing unit (e.g., executing a macro-instruction, executing a micro-instruction, etc.). For example, a read operation may be performed as a result of executing a load instruction. During execution of a program, the same read operation may be performed, albeit with different values. One instance of a read operation may hit in cache while a subsequent instance of the same read operation misses in the cache. The description also refers to low-latency memory and high-latency memory. Conventional low-latency memory includes L1 cache and L2 cache, but refers to memory that operates at a speed at least sufficient to avoid stalling an accessing processing unit, whether the low-latency memory is on-chip or off-chip. Conversely, high-latency memory, previously illustrated as including off-chip cache (e.g., L3 cache) and main memory, is memory that operates at a speed insufficient to avoid stalling an accessing processing unit.

A relatively small value predictor structure, whether implemented in hardware, software, or a combination of hardware and software, suffices for value prediction of missing instances of read operations. Value predicting for only those instances of read operations that miss, substantially reduces the number of operations to be tracked in a value prediction structure, while maintaining value prediction for the largest source of performance degradation—missing read operation instances. Typically, missing read operations instances account for a small fraction of the operations of an application, but for nearly all of the performance degradation due to access latency.

Figure 1:
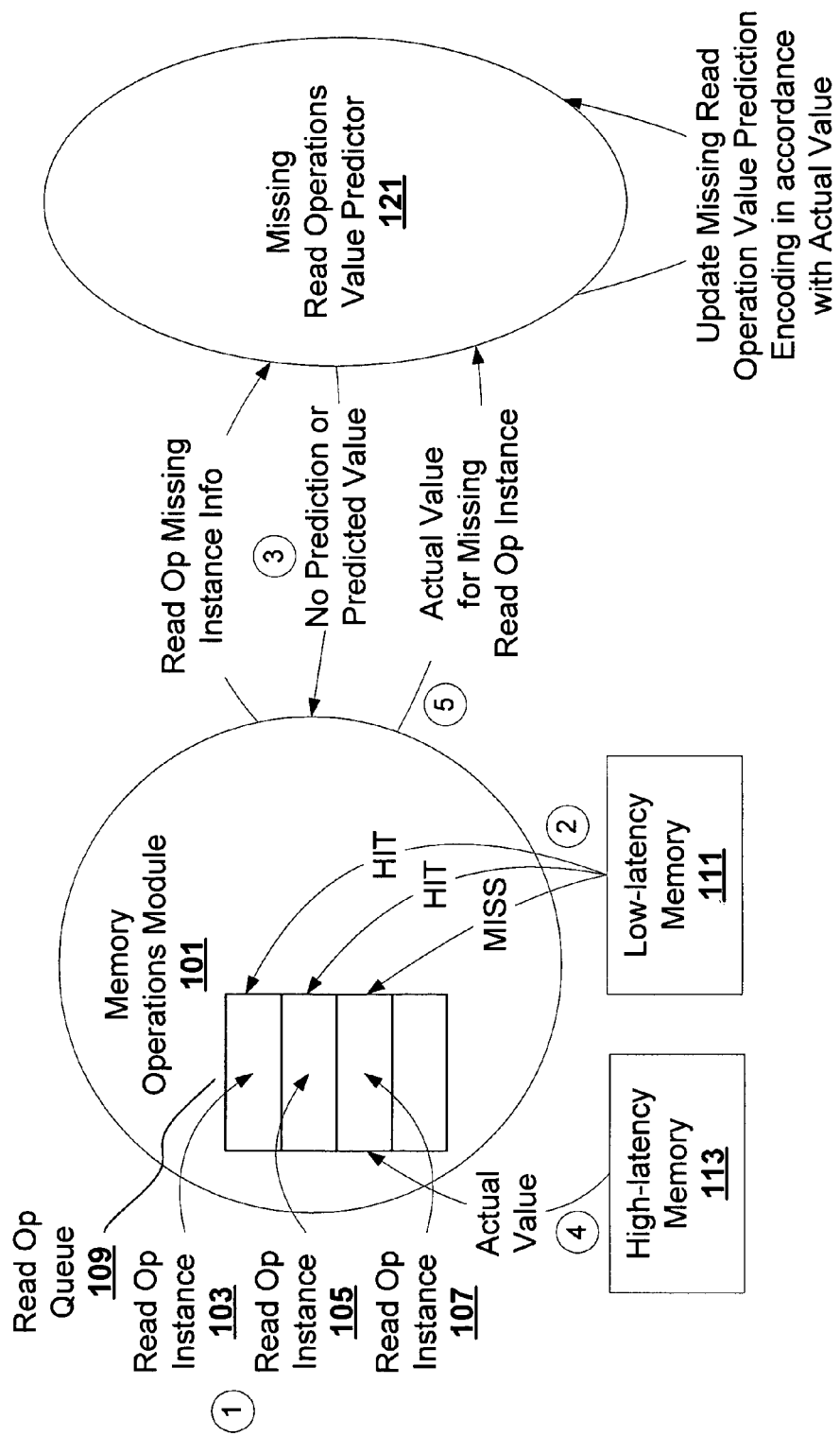
FIG. 1 depicts value prediction for missing instances of read operations.

FIG. 1 depicts value prediction for missing instances of read operations. A memory operations module 101 hosts a read operation queue 109, and interacts with a missing read operation value predictor 121. Realizations of the invention implement the memory operations module 101 and the missing read operation value predictor 121 differently (e.g., both may be implemented in a single structure, in separate structures, as hardware, as software, hardware and software, etc.). Furthermore, the memory operations module may be a load buffer, a load-store buffer, a memory disambiguation buffer, etc. For purposes of the illustration of FIG. 1, the memory operations module 101 is at least aware of read operations and requests values for the read operations. At a time 1, read operations instances 103, 105, and 107 are installed in the read operation queue 109. The memory operations module 101 requests respective values for the read operations instances 103, 105, and 107 from a low-latency memory (e.g., L1 cache, L2, cache, etc.). The respective values are supplied from the low-latency memory 111 to the memory operations module 101 for the read operations instances 103 and 105 (i.e., they hit in the low-latency memory). However, the value(s) for the read operation instance 107 misses in the low-latency memory 109 (i.e., the value(s) is not available and is not supplied).

Since the read operation instance 107 misses in the low-latency memory 109, the memory operations unit 101 queries the missing read operation value predictor 121 for the read operation instance 107 and queries a high-latency memory 113 (e.g., off-chip cache, main memory, etc.) for the value(s). The missing read operation value predictor 121 either does not make a value prediction for the read operation instance 107 or supplies a predicted value for the read operation instance 107. If a predicted value is not supplied, then the read operation instance 107 stalls until arrival of its value(s) from the high-latency memory. Otherwise, the read operation instance 107 is speculatively executed with the supplied predicted value(s).

At a time 4, the actual value(s) arrives from the high-latency memory 113. At a time 5, the actual value is supplied to the missing read operation value predictor 121. The missing read operation value predictor 121 updates a value prediction encoding in accordance with the supplied actual value. A value prediction encoding may be implemented with any of a variety of logical structures (e.g., hash tables, trees, etc.) and/or hardware structures (e.g., content addressable memory, direct mapped memory, set associative memory, etc.).

A missing read operations encoding includes information that allows for predicted values to be maintained and supplied to missing instances of read operations. An exemplary missing read operation encoding includes entries that indicate read operations, their respective predicted values, and their respective value prediction qualifiers. Missing read operations value prediction encodings may include additional information for identifying read operations, regulating value predictions, etc. Moreover, missing read operations value prediction encoding may vary in relation to the various techniques utilized for accessing the encodings.

FIGS. 2A-2C depict exemplary missing read operations value prediction encodings. FIG. 2A depicts an exemplary missing read operations value prediction encoding indexed by program counter. A missing read operations value prediction encoding 201 indicates a predicted value and a value prediction qualifier. The predicted value, as already described, is supplied to a missing instance of a read for speculative execution of the missing instance of the read operation. The value prediction qualifier is used as a basis for whether or not the predicted value should be supplied (e.g., whether a given threshold of confidence has been satisfied). A value prediction qualifier may be implemented as a confidence value, a strength value, etc. Each entry is indexed by the program counter of a read operation. For example, in FIG. 1, the memory operations module 101 queries the missing read operation value predictor 121 with the program counter of the missing read operation instance 107, and supplies the program counter with the actual value.

FIG. 2B depicts an exemplary missing read operations value prediction encoding with indices and tags. Similar to FIG. 2A, a missing read operations value prediction encoding 203 indicates indices, predicted values, and value prediction qualifiers for missing read operations. The missing read operations value prediction encoding 203 also indicates tags. The missing read operations value prediction encoding 203 is indexed by high order bits of a read operation's program counter instead of its entire program counter. After indexing into the missing read operations value prediction encoding 203 with a read operation's high order program counter bits, a corresponding tag for that entry is used to verify that the indexed entry is the correct entry for the read operation instance. FIG. 2B depicts an exemplary tag as a program counter.

FIG. 2C depicts an exemplary missing read operations value prediction encoding with hashed indices and tags. Similar to FIG. 2B, a missing read operations value prediction encoding 205 indicates indices, predicted values, value prediction qualifiers for missing read operations, and tags. However, the missing read operations value prediction encoding 203 is indexed by hashes of high order bits of a read operation's program counter. After indexing into the missing read operations value prediction encoding 205 with the hashed high order bits of the program counter, a corresponding tag for the indexed entry is used to verify that the indexed entry is the correct entry for the read operation instance. FIG. 2B depicts an exemplary tag as a hash of a program counter and history information.

Figure 3:
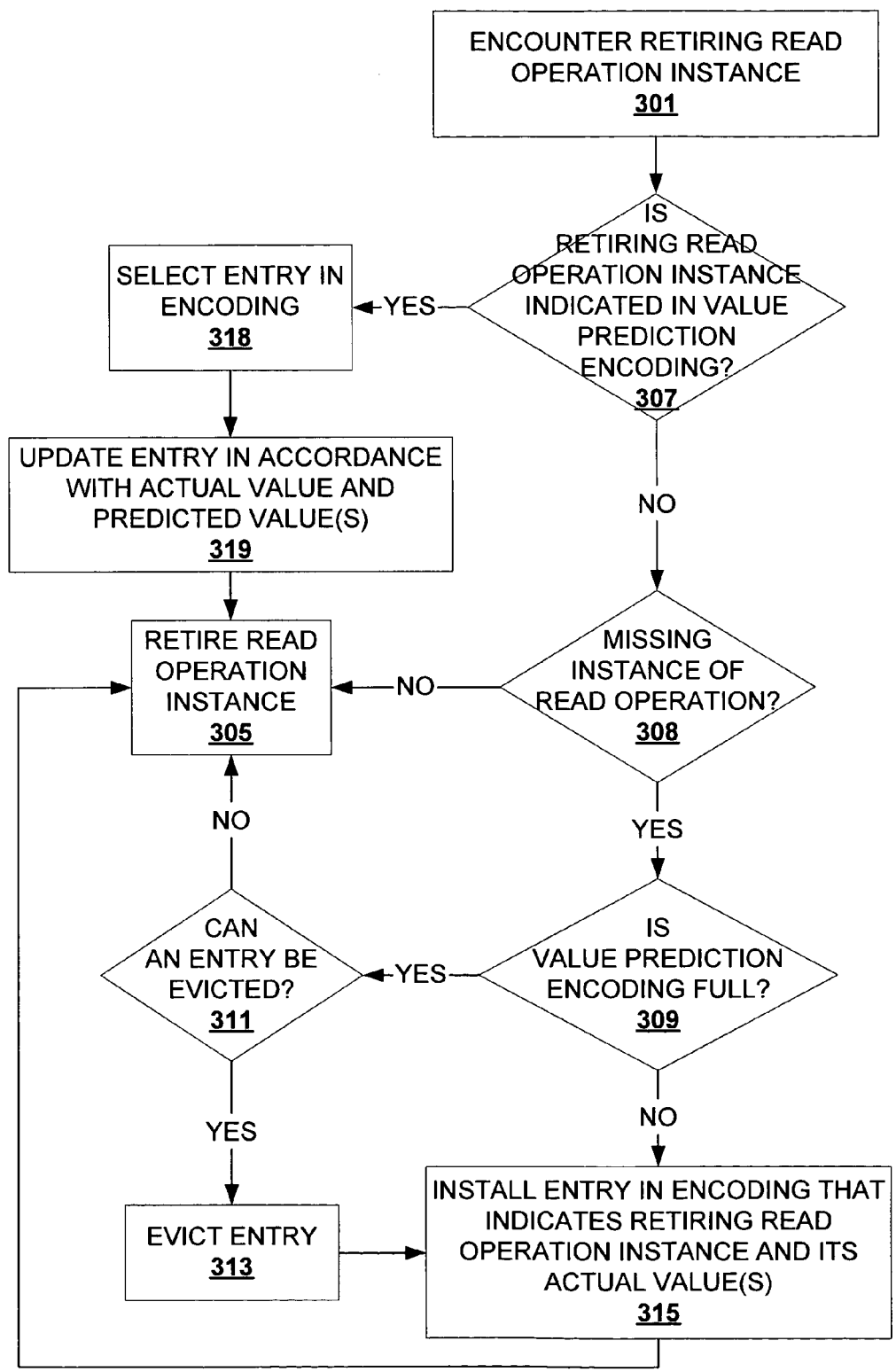
FIG. 3 depicts an exemplary flowchart for installing entries in a missing read operations value prediction encoding.
Figure 4:
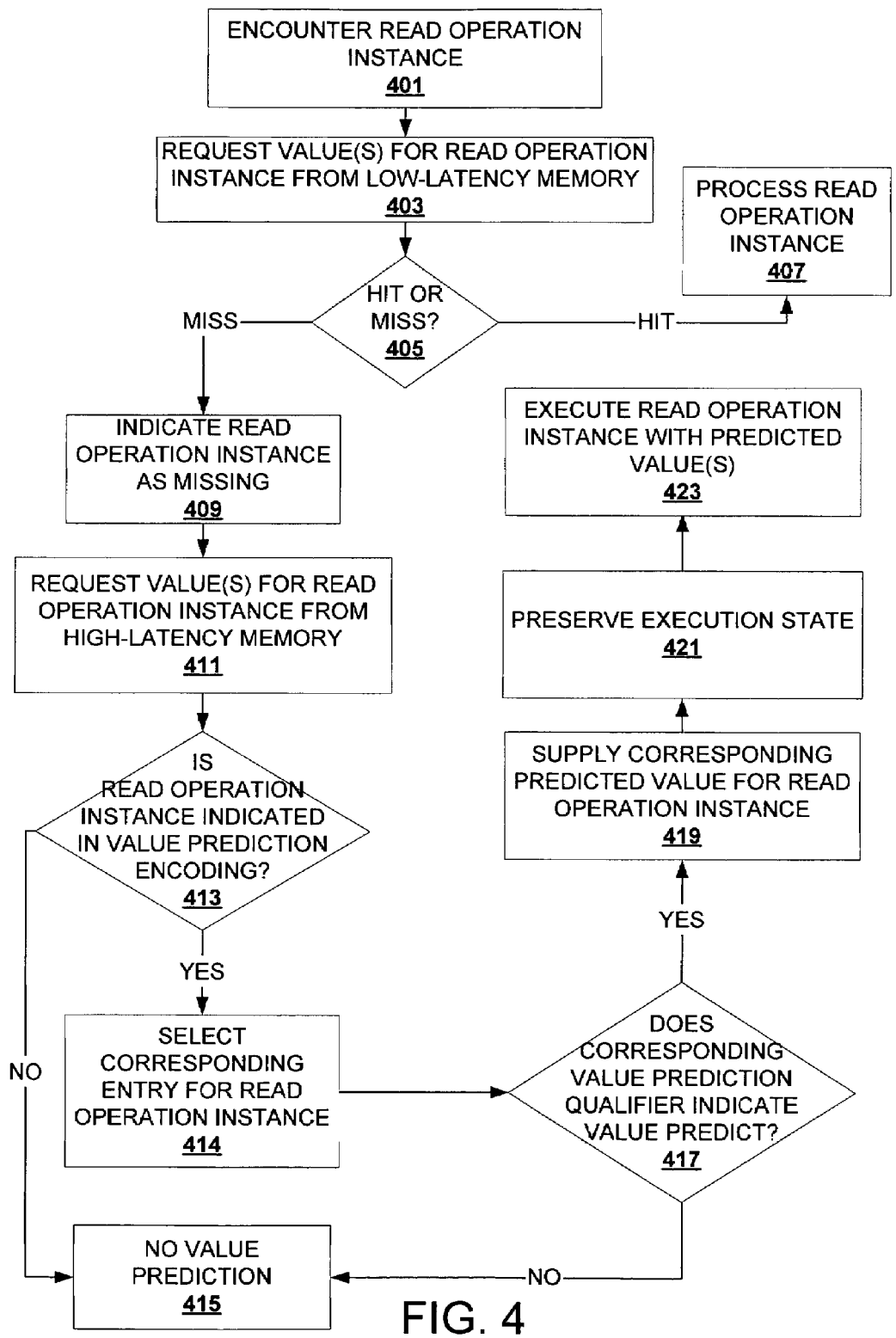
FIG. 4 depicts an exemplary flowchart for value predicting for missing instances of read operations.
Figure 5:
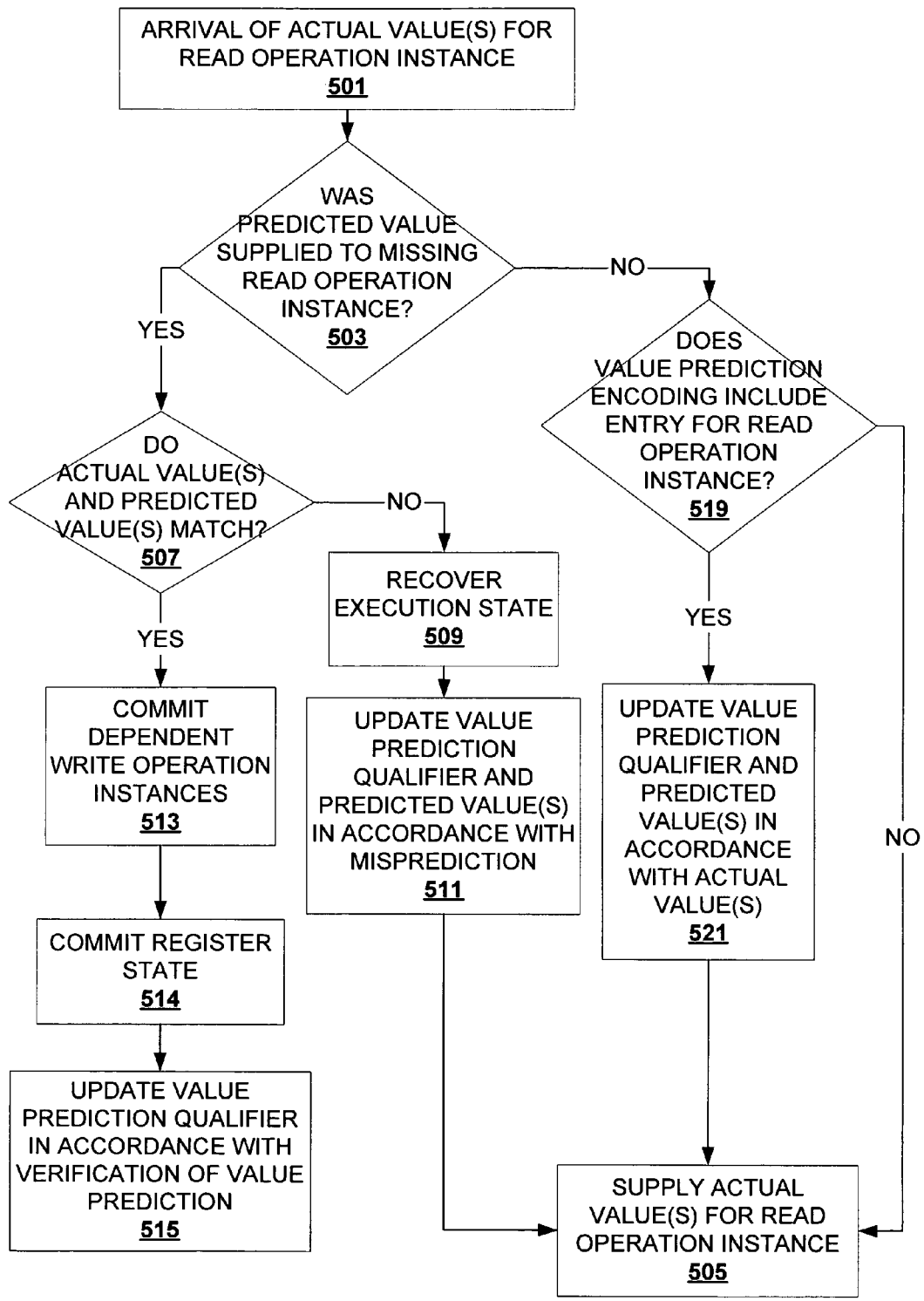
FIG. 5 depicts an exemplary flowchart for updating a missing read operations value prediction encoding.

A missing read operations value prediction encoding is maintained and utilized by hardware, software, and/or firmware. FIGS. 3-5 depicts exemplary flowcharts for maintaining and utilizing a missing read operations value prediction encoding.

FIG. 3 depicts an exemplary flowchart for installing entries in a missing read operations value prediction encoding. At block 301, a retiring instance of a read operation is encountered. At block 307, it is determined if the read operation is indicated in a missing read operations value prediction encoding. If the read operation is indicated in the missing read operations value prediction encoding, then control flows to block 318. If the retiring read operation instance is not indicated in the missing read operations value prediction encoding, then control flows to block 308.

At block 318, the entry is selected. At block 319, the selected entry is updated in accordance with an actual value of the retiring instance of the read operation and the predicted value(s) indicated in the selected entry (e.g., the predicted value is changed to the actual value if they do not match, a corresponding value prediction qualifier is increased if they do match, etc.). Control flows from block 319 to block 305.

At block 308, it is determined if the retiring instance of the read operation is a missing instance. If the read operation instance missed in memory, then control flows to block 309. If the read operation instance did not miss in memory, then control flows to block 305.

At block 309, it is determined if the missing read operations value prediction encoding is full. If the value prediction encoding is full, then control flows to block 311. If the value prediction encoding is not full, then control flows to block 315.

At block 315, an entry is installed in the value prediction encoding that indicates the read operation and the actual value(s) of the retiring instance of the read operation as the predicted value. Control flows from block 315 to block 305.

At block 311, it is determined if at least one entry can be evicted. If at least one entry can be evicted, then control flows to block 313. If at least one entry cannot be evicted, then control flows to block 305. Realizations of the invention can implement various techniques for evicting entries from the missing read operations value prediction encoding (e.g., periodic scavenging of the encoding, coincident with installation and/or updating, based on program counter, based on a time field, etc.).

At block 305, the read operation instance is retired.

At block 313, the at least one entry is evicted. Control flows from block 313 to block 315.

The exemplary flowchart depicted by FIG. 3 delays installation of an entry in the missing read operations value prediction encoding for a missing instance of a read operation until the read operation instance reaches the retirement stage. Waiting to install an entry until the retirement stage prevents mis-speculated instances of read operations from polluting the missing read operations value prediction encoding. For example, a missing instance of a read operation may be on a control mis-speculated path. Realizations of the invention may install entries in the missing read operations value prediction encoding upon detection of the miss, and uninstall those entries that correspond to read operations instances later determined to be mis-speculated.

FIG. 4 depicts an exemplary flowchart for value predicting for missing instances of read operations. At block 401, a read operation instance is encountered. At block 403, a value(s) is requested for the read operation instance from a low-latency memory. At block 405, it is determined if the request hits or misses in the low-latency memory. If the request hits in low-latency memory, then control flows to block 407. If the request misses in low-latency memory, then control flows to block 409.

At block 407, the read operation instance is processed (e.g., the read operation instance is executed with the value retrieved from the low-latency memory).

At block 409, the read operation instance is indicated as missing or tagged as missing (e.g., reserved bits or extended bits may be set to identify the read operation instance as missing, an additional field or bit in hardware may be set, etc.). At block 411, the value(s) is requested for the read operation instance from a high-latency memory. At block 413, it is determined if the missing read operation instance is indicated in a value prediction encoding. If the missing read operation instance is not indicated in the value prediction encoding, then control flows to block 415. If the read operation is indicated in the value prediction encoding, then control flows to block 417.

At block 415, value prediction is not performed, and execution of the read operation (and its dependents) is delayed until arrival of the actual value(s).

At block 414, an entry that corresponds to the read operation is selected. At block 417, it is determined if a value prediction qualifier of the selected entry indicates that value prediction should be performed. If the value prediction qualifier does not indicate that value prediction should be performed, then control flows to block 415. If the value prediction qualifier does indicate that value prediction should be performed, then control flows to block 419.

At block 419, a predicted value(s) of the selected entry is supplied for the missing instance of the read operation. At block 421, execution state is preserved. Various realizations of the invention utilize a variety of techniques to preserve execution state (e.g., buffering results of operations dependent on the missing read operation instance, checkpointing register state, buffering results of write operation instances dependent on the missing read operation instance, etc.). At block 423, the read operation instance is executed with the predicted value(s).

FIG. 5 depicts an exemplary flowchart for updating a missing read operations value prediction encoding. At block

501, an actual value(s) arrives for an instance of a read operation. At block 503, it is determined if the read operation instance was executed with a predicted value. Although realizations determine whether a read operation instance was executed with a predicted value differently, some tag the read operation instance (e.g., set a bit, a flag, etc.), at the time of prediction, to indicate that its value was predicted. If the read operation instance was executed with a predicted value, then control flows to block 507. If the read operation instance was not executed with a predicted value, then control flows to block 519.

At block 519, it is determined if the value prediction encoding includes an entry for the read operation. If the value prediction encoding includes an entry for the read operation, then control flows to block 521. If the value prediction encoding does not include an entry for the read operation, then control flows to block 505.

At block 521, a predicted value and a value prediction qualifier of the entry is updated in accordance with the actual value (e.g., if the actual value matches the predicted value then the value prediction qualifier is increased; if the actual value and the predicted value do not match, then the predicted value is changed to the actual value and the value prediction qualifier is decreased). At block 505, the actual value(s) is supplied for the read operation instance.

At block 507, it is determined if the actual value(s) and the predicted value(s) match. If they do not match, then control flows to block 519. If they match, then control flows to block 513.

At block 509, execution state is recovered. At block 511, a corresponding value prediction qualifier and the predicted value for the missing read operation instance are updated in accordance with the actual value (i.e., the predicted value is changed to the actual value and the value prediction qualifier is decreased). Control flows from block 511 to block 505.

At block 513, dependent write operation instances are committed or made visible (e.g., buffered results of dependent write operation are written to L2 cache). At block 514, register state is committed (e.g., contents of speculative registers are moved to architecture registers). At block 515, a value prediction qualifier for the missing read operation instance is updated in accordance with verification of the value prediction (e.g., the value prediction qualifier is increased).

While the flow diagram shows a particular order of operations performed by certain realizations of the invention, it should be understood that such order is exemplary (e.g., alternative realizations may perform the operations in a different order, combine certain operations, overlap certain operations, perform certain operations in parallel, etc.). For example, blocks 409, 411, and 413 of FIG. 4 may be performed in parallel, in a different order, etc. In FIG. 5, blocks 513 and 514 may be combined, either or both of blocks 513 and 514 may be performed in parallel with block 515, etc. The selection of entries in the missing read operations value prediction encoding illustrated in block 318 of FIG. 3 and block 414 of FIG. 4 may be respectively inherent to the determinations made in blocks 307 and 413.

Figure 6:
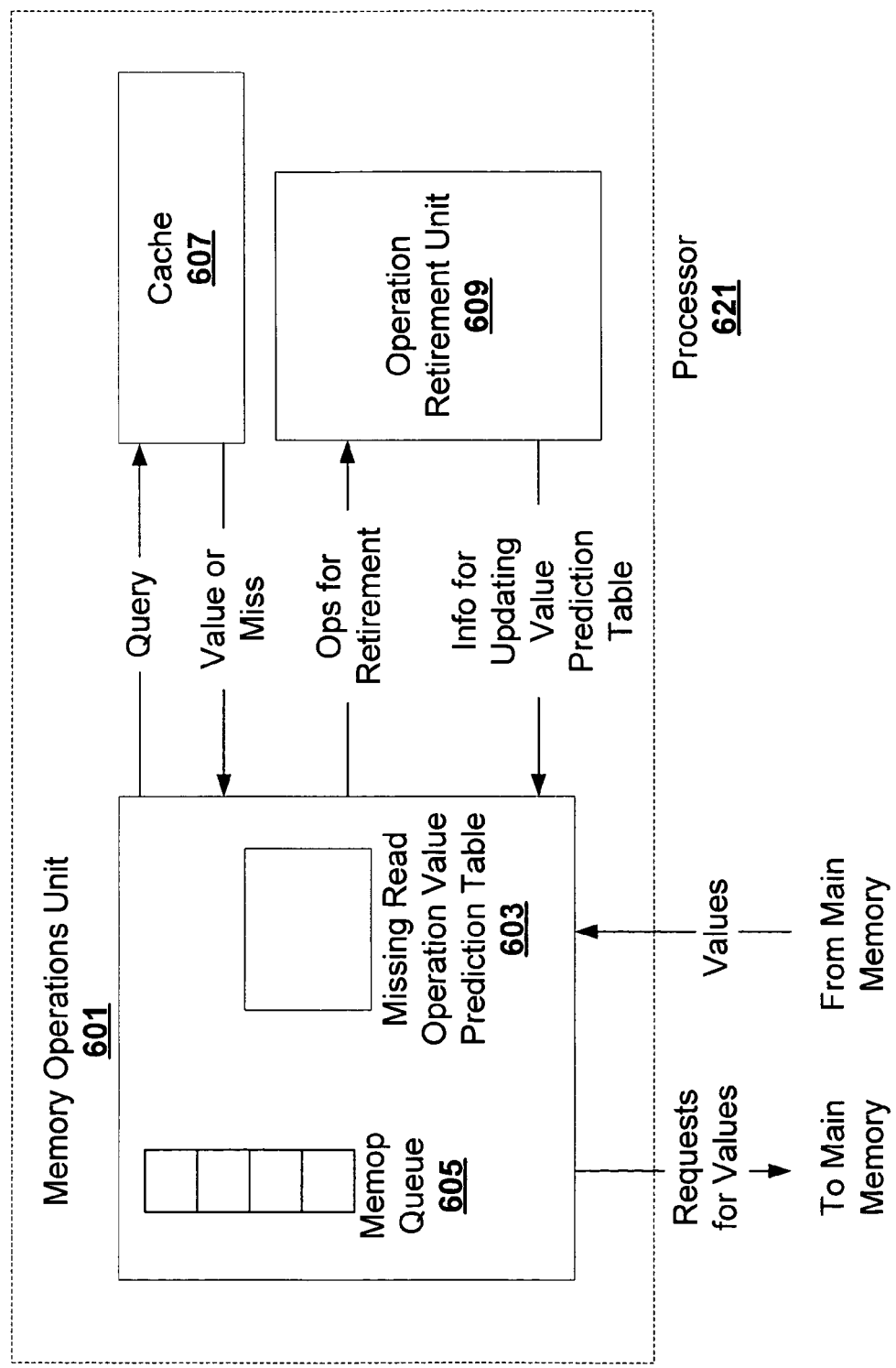
FIG. 6 depicts an exemplary processor that includes an exemplary missing read operations value prediction table.

As already stated, various realizations of the invention implement missing read operation value prediction differently. For example, the missing read operations value prediction encoding may be implemented in hardware, instantiated in memory, etc. Furthermore, various techniques may be utilized to perform the missing read operation value prediction. FIGS. 6-8 depicts exemplary techniques for implemented missing read operation value prediction.

FIG. 6 depicts an exemplary processor that includes an exemplary missing read operations value prediction table. A processor 621 includes a cache 607, an operation retirement unit 609, and a memory operations unit 601. The memory operations unit 601 (e.g., a load buffer, a load-store buffer, a memory disambiguation buffer, etc.) includes a memory operations queue 605 and a missing read operation value prediction table 603 (e.g., content addressable memory, direct mapped memory, set associative memory, etc.)). The memory operations queue 605 hosts memory operations (e.g., loads and stores). The missing read operation value prediction table 603 includes information similar to the missing read operations value prediction encodings depicted in FIGS. 2A-2C. The memory operations unit 601 queries the cache 607 for a read operation instance. From the cache 607, either a value(s) is retrieved or the read operation instance misses. As previously described, the memory operations unit 601 accesses the missing read operation value prediction table 603 if the read operation instance misses the cache 607 and requests the value(s) from main memory, which then supplies the value(s) to the processor 621. Executed memory operations are passed to the operation retirement unit 609. The operation retirement unit 609 retires operations and passes information for updating the value prediction table 603 to the memory operations unit 601.

A significant amount of time passes during access to high-latency memory for a missing instance of a read operation (e.g., delay can range from hundreds of cycles to thousands of cycles). Restricting value prediction to missing instances of read operations removes potential time constraints on a value predictor mechanism. Hence, a value predictor implemented in software or firmware would still provide a value prediction faster than an access to high-latency memory, although slower than a hardware implementation of the value predictor. Implementing the value predictor in software or firmware, facilitates flexible application of the value predictor. For example, a processor with multiple cores could use a common value predictor to value predict for missing instances of read operations from the different cores, separate value predictors can be implemented for individual cores, etc.

Figure 7A:
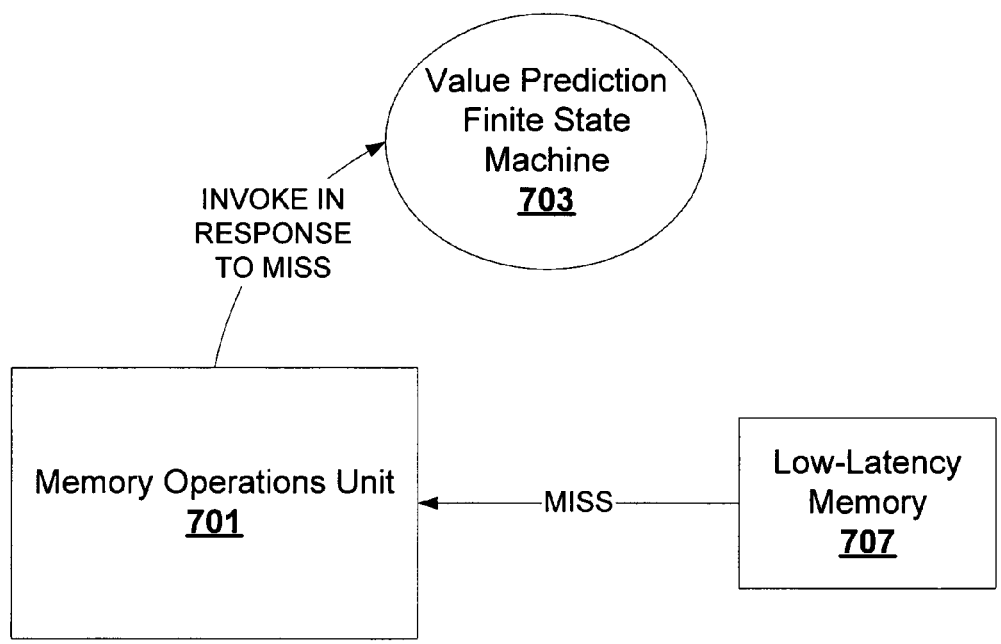
FIGS. 7A-7C depict exemplary missing read operation value prediction with a finite state machine mechanism.
Figure 7B:
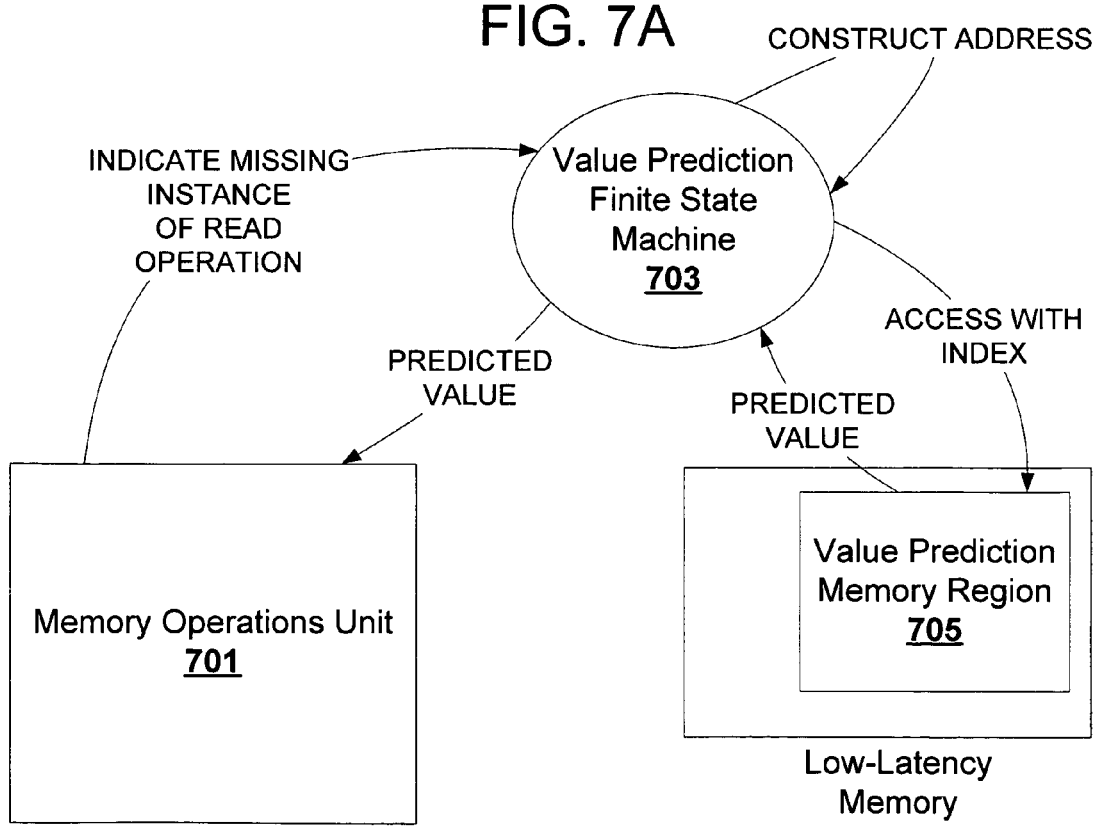
Figure 7C:
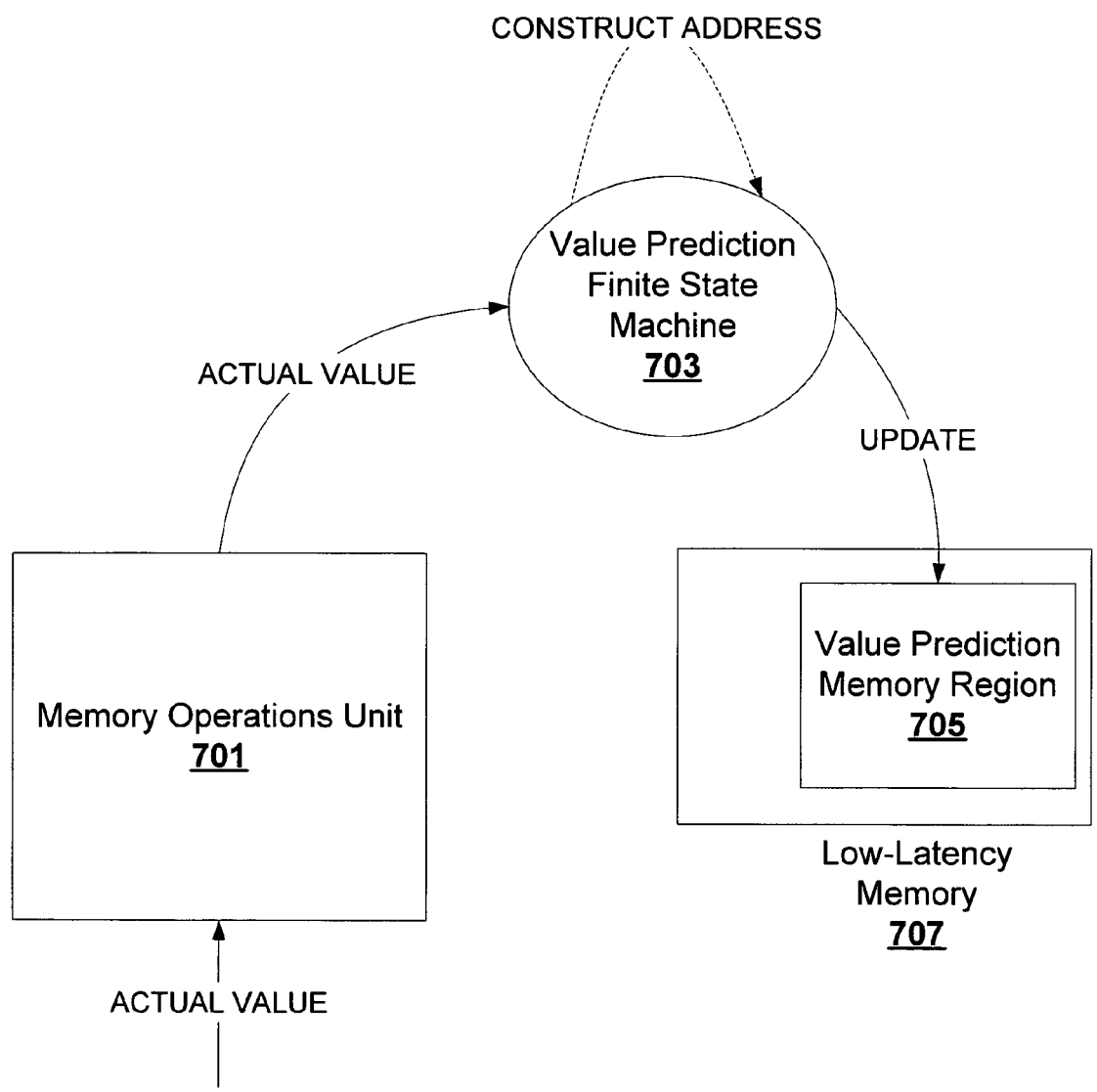

FIGS. 7A-7C depict exemplary missing read operation value prediction with a finite state machine mechanism. FIG. 7A depicts exemplary invocation of a value prediction finite state machine. A memory operations unit 701 queries a low-latency memory 707 (e.g., L2 cache) for a read operation instance's value, and misses in the low-latency memory 707. Coincident with missing in the low-latency memory 707, the memory operations unit 701 invokes a value prediction finite state machine 703.

FIG. 7B depicts exemplary value prediction by a value prediction finite state machine. After invoking the value prediction finite state machine 703, the memory operations unit 701 indicates the missing read operation instance to the invoked value prediction finite state machine 703. The value prediction finite state machine 703 accesses a value prediction memory region 705 instantiated in the low-latency memory 707.

Various techniques can be utilized for instantiating the value prediction memory region. For example, during initialization of a host processing unit, a memory region (i.e., a range of addresses) of one or more pages is allocated from L2 cache. The value prediction memory region is marked to prevent migration of the value prediction memory to L1 cache. The L1 cache recognizes this region of memory as non-cacheable. When a line from the value prediction memory region is sent from memory to the L2 cache, additional information (e.g., a bit) is also sent to indicate that the line of memory should not be passed to L1 cache. This prevents displacement of more latency critical entries from the L1 cache.

Referring again to FIG. 7B, the value prediction finite state machine 703 constructs an address to access the correct entry in the value prediction memory region 705. For example, the value prediction finite state machine 703 contains the base register for the value prediction memory region. The value prediction finite state machine 703 constructs the address from the base register, a read operation identifier (e.g., program counter), and possibly additional information that identifies the read operation. Assuming the addressed entry matches the read operation and the value prediction qualifier indicates that value prediction should be performed, a predicted value is supplied from the addressed entry of the value prediction memory region 705. The value prediction finite state machine 703 passes along the predicted value to the memory operations unit 701 to execute the missing read operation instance.

FIG. 7C depicts exemplary updating of the value prediction memory region. The memory operations unit 701 supplies an actual value received from main memory for the missing read operation instance to the value prediction finite state machine 703. The value prediction finite state machine updates the value prediction memory region 705 with the actual value.

Figure 8A:
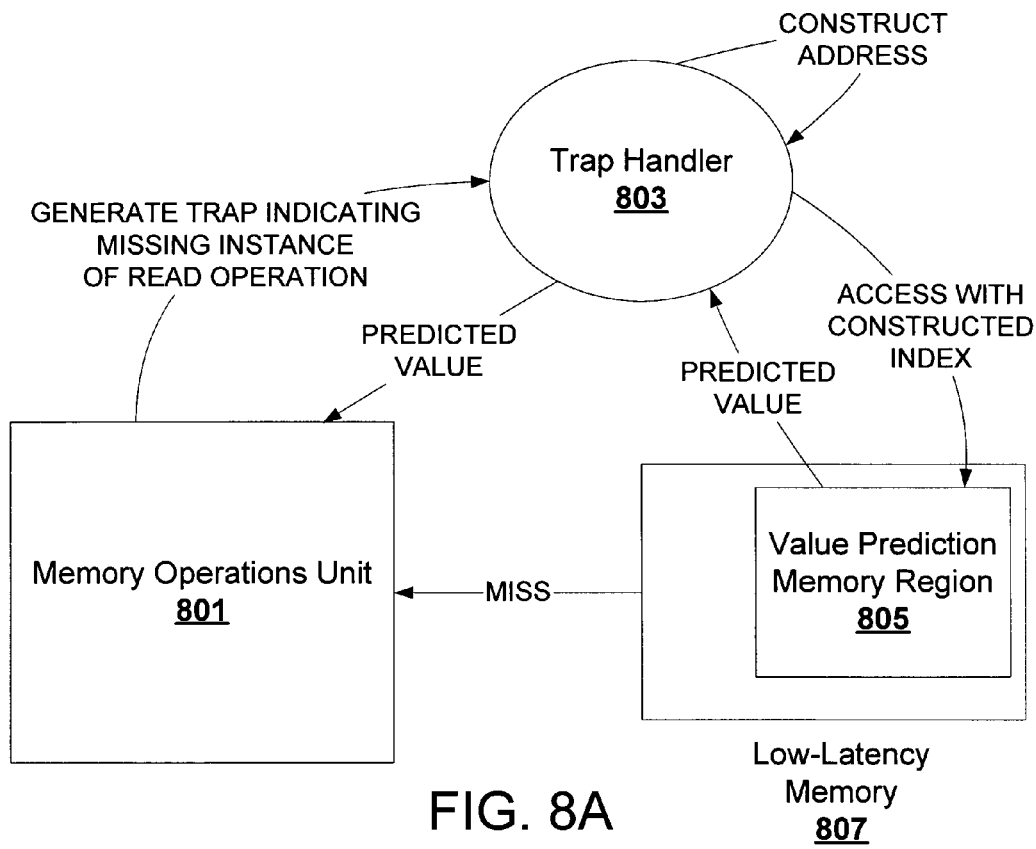
FIGS. 8A-8B depict an exemplary trap mechanism for missing read operation value prediction.
Figure 8B:
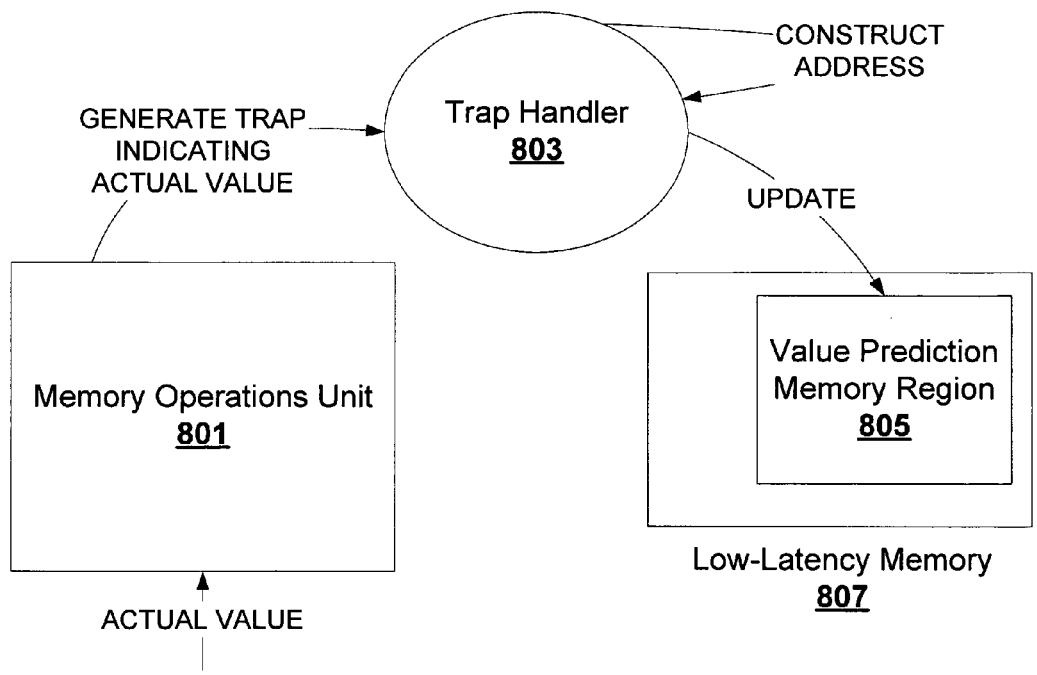

FIGS. 8A-8B depict an exemplary trap mechanism for missing read operation value prediction. FIG. 8A depicts exemplary missing read operation value prediction by a trap handler. A read operation instance misses in a low-latency memory 807. In response to the miss, a memory operations unit 801 generates a user-level trap that at least indicates the missing read operation instance. A trap handler 803 constructs an address with read operation identifying information in the generated trap, and accesses a value prediction memory region 805 with the constructed address. For example, the trap handler 803 uses a base address of the value prediction memory region 805 and identifying information for the read operation from the trap (e.g., program counter and possible additional identifying information, such as history information). A predicted value for the missing read operation instance is supplied from the value prediction memory region 805 to the trap handler 803. The trap handler 803 supplies the predicted value to the memory operations unit 801.

FIG. 8B depicts exemplary updating of the value prediction memory region by the trap handler. The memory operations unit 801 receives an actual value for the missing read operation instance, and generates a trap that indicates the actual value. The trap handler 803 handles the generated trap and updates the value prediction memory region 805 accordingly.

The realizations of the invention depicted in FIGS. 6-8 are intended to aid in understanding the invention and not meant to be limiting upon the invention. For instance, another realization utilizes the previously described finite state machine mechanism to perform value prediction for missing instances of read operations and the previously described trap handling mechanism to update the value prediction memory region.

The described invention may be provided as a computer program product, or software, that may include a machine-readable medium having stored thereon instructions, which may be used to program a computer system (or other electronic devices) to perform a process according to the present invention. A machine-readable medium includes any mechanism for storing or transmitting information in a form (e.g., software, processing application) readable by a machine (e.g., a computer). The machine-readable medium may include, but is not limited to, magnetic storage medium (e.g., floppy diskette); optical storage medium (e.g., CD-ROM); magneto-optical storage medium; read only memory (ROM); random access memory (RAM); erasable programmable memory (e.g., EPROM and EEPROM); flash memory; electrical, optical, acoustical or other form of propagated signal (e.g., carrier waves, infrared signals, digital signals, etc.); or other types of medium suitable for storing electronic instructions.

Figure 9:
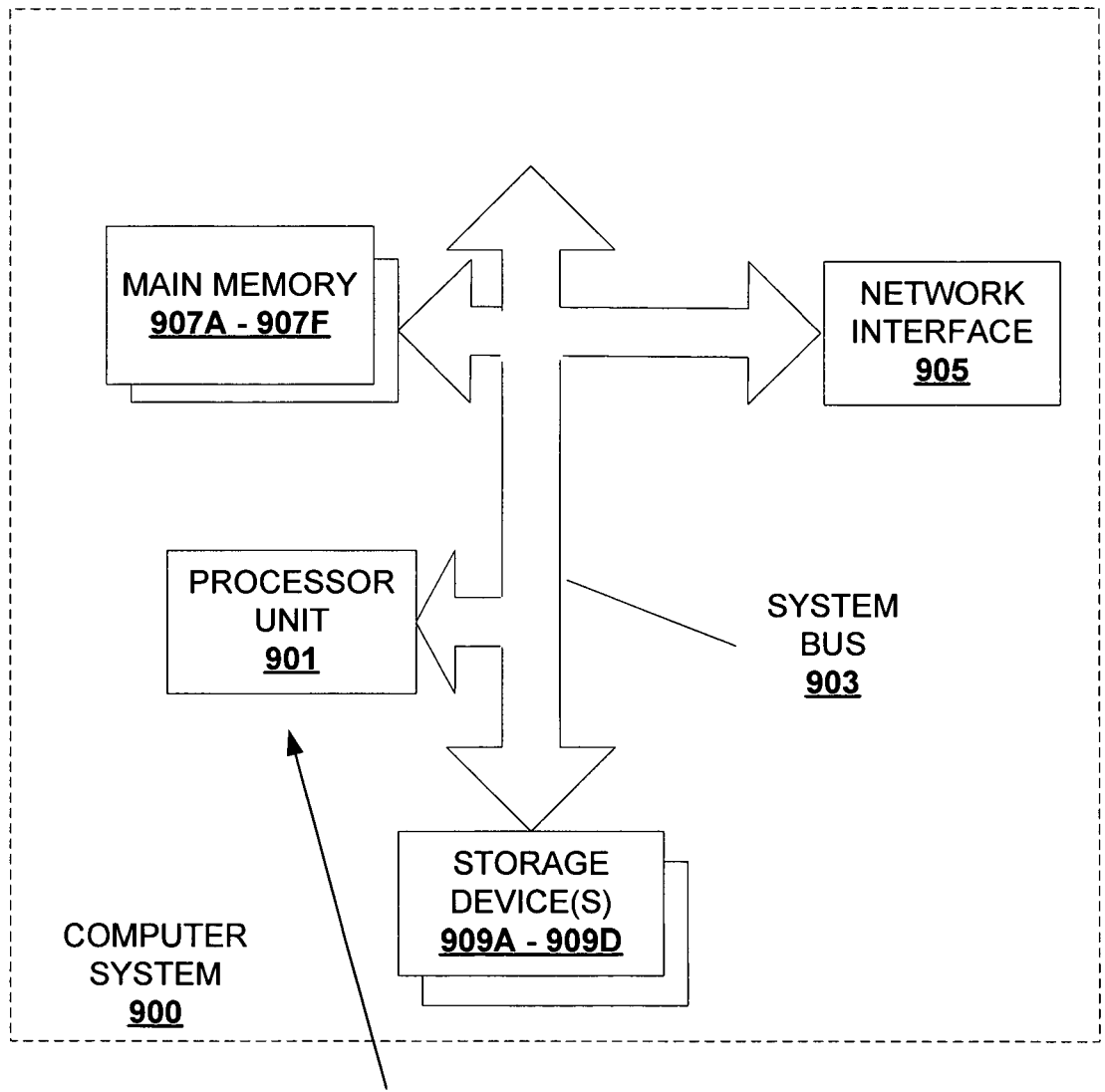
FIG. 9 depicts an exemplary computer system according to realizations of the invention.

FIG. 9 depicts an exemplary computer system according to realizations of the invention. A computer system 900 includes a processor unit 901 (possibly including multiple processors). The computer system 900 also includes a main memory 907A-907F (e.g., one or more of cache, SRAM DRAM, RDRAM, EDO RAM, DDR RAM, EEPROM, etc.), a system bus 903 (e.g., LDT, PCI, ISA, etc.), a network interface 905 (e.g., an ATM interface, an Ethernet interface, a Frame Relay interface, etc.), and a storage device(s) 909A-909D (e.g., optical storage, magnetic storage, etc.). Realizations of the invention may include fewer or additional components not illustrated in FIG. 9 (e.g., video cards, audio cards, additional network interfaces, peripheral devices, etc.). The processor unit 901, the storage device(s) 909A-909D, the network interface 905, and the main memory 907A-907F are coupled to the system bus 903. The processor unit 901 includes a missing read operations value predictor. In some realizations of the invention, the missing read operations value predictor and/or associated functionality, such as value predicting and/or maintenance of the missing read operations value prediction encoding, may alternatively be embodied in the main memory 907A-907F.

While the invention has been described with reference to various realizations, it will be understood that these realizations are illustrative and that the scope of the invention is not limited to them. Many variations, modifications, additions, and improvements are possible. More generally, realizations in accordance with the present invention have been described in the context of particular realizations. For example, the blocks and logic units identified in the description are for understanding the described invention and not meant to limit the described invention. Functionality may be separated or combined in blocks differently in various realizations of the invention or described with different terminology.

These realizations are meant to be illustrative and not limiting. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the exemplary configurations may be implemented as a combined structure or component. These and other variations, modifications, additions, and improvements may fall within the scope of the invention as defined in the claims that follow.

What is claimed is:

1. A processor that value predicts for selective instances of read operations, the processor value predicting for those instances of read operations with values that are unavailable in a low-latency memory and requested from a high-latency memory while ignoring those instances of read operations unavailable in the low-latency memory requested from a second low-latency memory, and that at least partially bases the selective value predictions on accuracy of value predictions for prior corresponding missing instances of the read operations.

2. The processor of claim 1, wherein the low-latency memory includes one or more of L1 cache and L2 cache.

3. The processor of claim 1, wherein the high-latency memory includes one or more of L3 cache, random access memory, flash memory, erasable programmable memory, and read-only memory.

4. The processor of claim 1, wherein the processor includes a memory operations unit that comprises a missing read operation value prediction structure used by the processor to value predict for the missing instances of read operations.

5. The processor of claim 4, wherein the memory operations unit includes a load store queue or a memory disambiguation buffer.

6. The processor of claim 4, wherein the missing read operation value prediction structure includes entries to host indications of read operations, predicted values, and value prediction qualifiers.

7. The processor of claim 6, wherein the value prediction qualifiers reflect the accuracy of prior value predictions.

8. The processor of claim 6, wherein the value prediction qualifiers include one or more of confidence values and strength values.

9. The processor of claim 1, wherein the processor causes invocation of a value prediction state machine to value predict for missing instances of read operations, said invocation being coincident with detection of a read operation instance missing in the low-latency memory.

10. The processor of claim 9, wherein the value prediction state machine accesses a missing read operations value prediction encoding to value predict, wherein the low-latency memory hosts at least a part of the missing read operations value prediction encoding.

11. The processor of claim 10, wherein said value prediction state machine accesses the missing read operations value prediction encoding with an address constructed from a base register and from read operation identifying information.

12. The processor of claim 9, wherein the processor causes traps to be issued coincident with arrival of actual values for missing instances of read operations, and a trap handler updates the missing read operations value prediction encoding in accordance with the traps, wherein the issued traps indicate the actual values.

13. The processor of claim 9, wherein the value prediction state machine updates the missing read operations value prediction encoding coincident with arrival of actual values for missing instances of read operations indicated in the missing read operations value prediction encoding.

14. The processor of claim 1, wherein the processor causes traps to be issued coincident with detection of read operation instances missing in the low-latency memory, and a trap handler accesses a missing read operations value prediction encoding to value predict in accordance with the issued traps, wherein the traps at least indicate the missing instances of the read operations.

15. The processor of claim 14, further comprising the trap handler to construct an address to access the missing read operations value prediction encoding.

16. The processor of claim 15, wherein the address is constructed from a base address and read operation identifying information.

17. The processor of claim 14, wherein the low-latency memory hosts at least a part of the missing read operations value prediction encoding.

18. The processor of claim 14, wherein the processor causes traps to be issued coincident with arrival of actual values for value predicted missing instances of read operations, and the trap handler updates the missing read operations value prediction encoding accordingly, wherein the traps coincident with actual value arrivals at least indicate the actual values.

19. The processor of claim 1 further comprising the processor preserving execution state.

20. The processor of claim 19, wherein said preserving execution state comprises checkpointing register state prior to speculative execution of missing instances of read operations with predicted values, and returning to the checkpointed register state for those value predicted missing instances of read operations determined to be mis-predictions.

21. The processor of claim 19, wherein preserving execution state comprises the processor buffering results of instances of operations that are dependent on value predicted instances of read operations, and causing those buffered results that correspond to verified value predicted instances of read operations to be committed.

22. The processor of claim 21, wherein the dependent instances of operations are instances of write operations.

23. The processor of claim 21, wherein the processor includes a first store to host instances of write operations and a second store to host the buffered results of those instances of the write operations that are dependent on missing instances of read operations.

24. A method comprising:
  detecting a first instance of a read operation missing in a low-latency memory and requested from a high-latency memory while ignoring the read operation missing in the low-latency memory requested from a second low-latency memory;
  indicating the read operation;
  indicating an actual value for the first instance of the read operation, wherein the actual value is from the high-latency memory;
  detecting a subsequent instance of the read operation missing in the low-latency memory; and
  supplying the indicated value for the read operation's subsequent instance, wherein the indicated value is supplied based, at least in part, on the first and subsequent instances missing in the low-latency memory.

25. The method of claim 24, wherein the low-latency memory includes one or more of L1 cache and L2 cache.

26. The method of claim 24, wherein the high-latency memory includes one or more of L3 cache, random access memory, flash memory, erasable programmable memory, or read-only memory.

27. The method of claim 24 further comprising:
  preserving execution state; and
  recovering execution state if the supplied indicated value does not match an actual value determined for the read operation's subsequent instance.

28. The method of claim 27, wherein preserving execution state comprises checkpointing register state.

29. The method of claim 27, wherein preserving execution state comprises buffering results of instances of operations dependent on the subsequent instance of the read operation.

30. The method of claim 29 further comprising committing the buffered results if the supplied indicated value matches the determined actual value.

31. The method of claim 24, wherein the read operation and the actual value for the first instance of the read operation are indicated in a missing read operations value prediction encoding.

32. The method of claim 31, wherein the missing read operations value prediction encoding also indicates a value prediction qualifier, and said supplying of the first instance's actual value is in accordance with the value prediction qualifier.

33. The method of claim 32 further comprising:
determining if the actual value of the subsequent instance of the read operation matches the supplied indicated value;
if the subsequent instance's actual value and the supplied value match, committing the subsequent instance of the read operation; and
updating the value prediction qualifier in accordance with said determining.

34. The method of claim 33, wherein said updating the value prediction qualifier comprises increasing the value prediction qualifier if the subsequent instance's actual value is determined to match the supplied value and decreasing the value prediction qualifier if the subsequent instance's actual value is determined not to match the supplied value.

35. The method of claim 24 embodied as a computer program product encoded on one or more machine-readable media.

36. A method comprising:
recording actual values of prior instances of read operations that miss in a low-latency memory and are requested from a high-latency memory but not prior instances of read operations that miss in the low latency memory requested from a second low-latency memory; and
supplying the actual values of the prior instances of the read operations to respective ones of subsequent instances of the read operations as predicted values, wherein the subsequent instances of the read operations also miss in the low-latency memory.

37. The method of claim 36, wherein the low-latency memory includes one or more of L1 cache and L2 cache.

38. The method of claim 36 further comprising:
preserving execution state prior to speculative execution of the prior read operations instances with the supplied values; and
recovering execution state when predicted values are determined to be mis-predicted values.

39. The method of claim 38, wherein preserving execution state comprises buffering results of instances of operations that are dependent on value predicted instances of the read operations, at least until the predicted values are verified.

40. The method of claim 38, wherein preserving execution state comprises checkpointing register state.

41. The method of claim 36 further comprising verifying predicted values as accurately predicted values.

42. The method of claim 36, wherein the actual values are recorded in a missing read operations value prediction encoding.

43. The method of claim 42 further comprising indicating the read operations in the missing read operations value prediction encoding.

44. The method of claim 43 further comprising indicating, in the missing read operations value prediction encoding, value prediction qualifiers for the indicated read operations.

45. The method of claim 44, wherein the value prediction qualifiers include one or more of confidence values and strength values.

46. The method of claim 43, wherein the read operations are indicated with one or more of their program counter high order bits, program counter low order bits, program counter, and history information.

47. The method of claim 46, wherein one or more of the read operations indicators are hashed individually or together.

48. A processing unit comprising:
a memory including a low-latency memory and a high latency memory;
a missing read operations value prediction encoding to host predicted values for instances of read operations that miss in the low latency memory and are requested from the high-latency memory but not instances of read operations that miss in the low-latency memory requested from a second low-latency memory; and
a memory operations unit coupled with the memory, the memory operations unit including, a missing read operation detection logic to detect instances of read operations that miss in the low-latency memory and to indicate those instances of read operations that miss in the low-latency memory and are requested from the high-latency memory.

49. The processing unit of claim 48, wherein the memory operations unit further comprises a missing read operation value predictor logic to utilize the missing read operations value prediction encoding to value predict for read operations instances indicated by the missing read operation detection logic.

50. The processing unit of claim 48, wherein the low-latency memory includes one or more of L1 cache and L2 cache.

51. The processing unit of claim 48, wherein the memory operations unit includes a hardware structure to host the missing read operations value prediction encoding.

52. The processing unit of claim 48, wherein a first region of the low-latency memory is marked during initialization of the processing unit to host the missing read operations value prediction encoding.

53. The processing unit of claim 52, wherein, during initialization of the processing unit, the marked region of the low-latency memory is marked to prevent entries of the missing read operations value prediction encoding from migrating to a second region of the low-latency memory.

54. The processing unit of claim 53, wherein the second region of the low-latency memory includes L1 cache.

55. The processing unit of claim 53 further comprising the missing read operation detection logic to cause issuance of first traps coincident with the missing read operation detection logic detecting a read operation instance missing in the memory, wherein the traps are issued to a trap handler.

56. The processing unit of claim 55, wherein the trap handler supplies predicted values to the memory operations unit for missing instances of read operations from the missing read operations value prediction encoding.

57. The processing unit of claim 56 further comprising the processing unit to generate second traps coincident with arrival of actual values for respective missing instances of read operations, wherein the trap handler updates the missing read operations value prediction encoding in accordance with the second traps.

58. The processing unit of claim 52, wherein the processing unit invokes a value predictor finite state machine that performs value prediction with the missing read operations value prediction encoding.

59. The processing unit of claim 48, wherein the memory operations unit includes a load store queue or a memory disambiguation buffer.

60. The processing unit of claim 48 further comprising an operations retirement unit coupled with the memory operations unit, the operations retirement unit to cause installation of entries in the missing read operations value prediction encoding for missing instances of read operations.

61. An apparatus comprising:
a memory including low-latency memory and high-latency memory; and
means for detecting and indicating read operations instances that miss in the low-latency memory and are requested from the high-latency memory, the means ignoring those instances of read operations that miss in the low-latency memory requested from a second low-latency memory, and value predicting for respective ones of subsequent instances of the read operations that also miss in the low-latency memory and are requested from the high-latency memory.

62. The apparatus of claim 61, wherein the low-latency memory includes one or more of L1 cache and L2 cache.

63. The apparatus of claim 61 further comprising means for preserving and recovering execution state in accordance with whether value prediction are accurate.

64. A system comprising:
a low-latency memory and a high-latency memory; and
a processing unit coupled with the high-latency memory, the processing unit including, a missing read operations value prediction encoding to host predicted values for instances of read operations that miss in the low-latency memory and are requested from the high-latency memory but not instances of read operations that miss in the low-latency memory requested from a second low-latency memory, a missing read operation detection unit coupled with the low-latency memory, the missing read operations detection unit to indicate instances of read operations that miss in the low-latency memory and are requested from the high-latency memory.

65. The system of claim 64, wherein the processing unit includes the low-latency memory.

66. The system of claim 64, wherein the processing unit includes a memory operations unit that includes the missing read operation detection unit.

67. The system of claim 66, wherein the memory operations unit includes a load store queue or a memory disambiguation buffer.

68. The system of claim 66, wherein the memory operations unit includes a structure to host the missing read operations value prediction encoding.

69. The system of claim 68, wherein the structure includes a content addressable memory.

70. The system of claim 64, wherein the high-latency memory includes one or more of L3 cache, random access memory, flash memory, erasable programmable memory, and read-only memory.

71. The system of claim 64, wherein the processing unit includes a missing read operation value predictor logic to utilize the missing read operations value prediction encoding to value predict for read operations instances indicated by the missing read operation detection logic.

72. The system of claim 64, wherein the missing read operations value prediction encoding is instantiable in the low-latency memory.

73. The system of claim 72, wherein the missing read operations encoding can be shared among multiple cores of the processing unit.

74. The system of claim 73, wherein a second missing read operations encoding can also be shared among the multiple cores, and wherein the missing read operations encoding and the second missing read operations encoding are instantiated for different applications.

75. The system of claim 72, wherein the low-latency memory includes L2 cache and L1 cache, wherein the missing read operation value predictor is instantiable in the L2 cache, but entries thereof are prevented from migrating to the L1 cache.

76. The system of claim 64 further comprising a bus that couples the high-latency memory with the processing unit.

77. The system of claim 64, wherein the processing unit includes a first store to host instances of write operations dependent on value predicted instances of read operations and a second store to host results of the instances of dependent write operations at least until verification of corresponding value predictions.

78. An article of manufacture comprising a computer program product encoded in one or more machine-readable media, the computer program product comprising:
a first sequence of instructions executable to select an entry in a missing read operations value prediction encoding that corresponds to a read operation instance that misses in a low-latency memory and is requested from a high-latency memory but not a read operation instance that misses in the low latency memory requested from a second low latency memory, and to supply a predicted value indicated in the selected entry for the missing read operation instance, wherein the selection is coincident with detection of the read operation instance missing in the low-latency memory; and
a second sequence of instructions executable to update the missing read operations value prediction encoding to reflect accuracy of value predictions for missing instances of read operations.

79. The article of manufacture of claim 78, wherein the missing read operations value prediction encoding is instantiable in the low-latency memory.

80. The article of manufacture of claim 79, further comprising a third sequence of instructions executable to prevent migration of the entries of the missing read operations value prediction encoding from the low-latency memory to a second memory.

81. The article of manufacture of claim 80, wherein the low-latency memory includes L2 cache and the second memory includes L1 cache.

82. The article of manufacture of claim 78, further comprising trap handler code that includes the first and second sequences of instructions, wherein a first set of the traps at least indicate missing instances of read operations, and a second set of the traps at least indicate missing instances of read operations and actual values thereof.

83. The article of manufacture of claim 78 further comprising a value predictor finite state machine code that includes the first sequence of instructions.

84. The article of manufacture of claim 83, wherein the value predictor finite state machine code receives indications of missing instances of read operations and constructs addresses therefrom to access the missing read operations value prediction encoding.

85. The article of manufacture of claim 84, wherein the value predictor finite state machine contains a base register also used in constructing the addresses.

86. The article of manufacture of claim 84 further comprising trap handler code that includes the second sequence of instructions, wherein traps handled by the trap handler at least indicate missing instances of read operations.

87. The article of manufacture of claim 86, wherein the trap handler accesses the missing read operations value prediction encoding with addresses constructed from a base address and read operations identifying information.

88. The article of manufacture of claim 78, wherein the first sequence of instructions to select the entry in the missing read operations value prediction encoding comprises the first sequence of instructions to, access the entry in the missing read operations value prediction encoding with an index; and determine that the accessed entry corresponds to the missing read operation instance.

89. The article of manufacture of claim 88, wherein the index is at least a part of the read operations static identifier.

90. The article of manufacture of claim 89, wherein the static identifier includes the read operation's program counter.

91. The article of manufacture of claim 88 further comprising constructing the index.

92. The article of manufacture of claim 91, wherein said constructing the index comprises hashing the read operation's static identifier.

93. The article of manufacture of claim 91, wherein said constructing the index comprises hashing the read operation's static identifier with history of the read operation.

94. An article of manufacture comprising a missing read operation value prediction structure encoded in one or more machine-readable media, the missing read operation value prediction structure comprising:

an index field to indicate an index;

a missing read operation field to indicate a read operation that misses in a low-latency memory and is requested from a high-latency memory but not a read operation that misses in the low-latency memory requested from a second low-latency memory;

a predicted value field to indicate a predicted value for instances of a read operation indicated in the missing read operation field; and a value prediction qualifier field to indicate a value prediction qualifier, wherein a predicted value indicated in the predicted value field is supplied to an instance of a read operation indicated in the missing read operation field in accordance with a value prediction qualifier indicated in the value prediction qualifier field.

95. The article of manufacture of claim 94, wherein the index includes one or more of a program counter, low-order bits of a program counter, high-order bits of a program counter, and history information.

96. The article of manufacture of claim 94, wherein the indication of the read operation includes one or more of at least a part of a program counter of the read operation, history information of the program counter, a hash of at least a part of the program counter, a hash of the history information, and a hash of the program counter and the history information.

97. The article of manufacture of claim 94, wherein the value prediction qualifier includes one or more of confidence, strength, and counter.

* * * * *

UNITED STATES PATENT AND TRADEMARK OFFICE
CERTIFICATE OF CORRECTION

PATENT NO.        : 7,340,567 B1                                      Page 1 of 1
APPLICATION NO.   : 10/824307
DATED             : March 4, 2008
INVENTOR(S)       : Yuan C. Chou et al.

It is certified that error appears in the above-identified patent and that said Letters Patent is hereby corrected as shown below:

In column 12, at line 32, please delete "21" and insert --22--.

In column 14, at line 56, please delete "53" and insert --52--.

Signed and Sealed this

Fifth Day of August, 2008

JON W. DUDAS
*Director of the United States Patent and Trademark Office*